United States Patent
Yu et al.

(10) Patent No.: US 7,394,221 B2
(45) Date of Patent: Jul. 1, 2008

(54) MECHANICALLY ISOLATED BATTERY CHARGING APPARATUS

(75) Inventors: Damien (Yat Shun) Yu, Burnaby (CA); Kenny Veng Hong Che, Vancouver (CA); Jian Jun Zhang, Bao Ji (CN)

(73) Assignee: VTech Telecommunications Limited, Tai Po, New Territory (HK)

( * ) Notice: Subject to any disclaimer, the term of this patent is extended or adjusted under 35 U.S.C. 154(b) by 317 days.

(21) Appl. No.: 10/743,839

(22) Filed: Dec. 24, 2003

(65) Prior Publication Data
US 2005/0156561 A1    Jul. 21, 2005

(51) Int. Cl.
*H02J 7/00* (2006.01)
(52) U.S. Cl. ........................ 320/113; 320/107
(58) Field of Classification Search ............ 320/107, 320/111, 112–115, 110
See application file for complete search history.

(56) References Cited

U.S. PATENT DOCUMENTS

| | | | |
|---|---|---|---|
| 5,384,207 A | 1/1995 | Ohtani | |
| 5,933,496 A | 8/1999 | McKinnon | |
| 6,014,009 A * | 1/2000 | Wierzbicki et al. | 320/107 |
| 6,049,192 A * | 4/2000 | Kfoury et al. | 320/113 |
| 6,326,766 B1 * | 12/2001 | Small | 320/112 |
| 6,356,054 B1 * | 3/2002 | Herrmann | 320/115 |
| 2002/0030467 A1 | 3/2002 | Small | |

OTHER PUBLICATIONS

Great Britan Search Report Dated Apr. 7, 2005.

* cited by examiner

*Primary Examiner*—Bao Q. Vu
*Assistant Examiner*—Richard V Muralidar

(57) ABSTRACT

A battery drawer for a cordless telephone or other apparatus that operates from both regular AC power and battery power and that has a stand-by battery recharging system and associated battery charging circuit. The battery drawer is slidably mounted in a body and is configured to receive and hold at least one rechargeable battery. A combination ejector and electrical circuit maker is associated with the battery drawer. The combination ejector and electrical circuit maker establishes an electric circuit between the battery charging circuit and the at least one rechargeable battery when the battery drawer is in a closed state, operates to eject the battery drawer from the body, and electrically opens the electric circuit between the battery charging circuit and the at least one rechargeable battery when the battery drawer is in an open state. Increased safety is afforded to users by disconnecting the battery drawer from the charging circuit when the battery is replaced in the drawer.

18 Claims, 6 Drawing Sheets

MECHANICALLY ISOLATED BATTERY CHARGING APPARATUS

BACKGROUND

1. Field of the Invention

The present invention relates generally to apparatus for holding, storing, and charging batteries.

2. Background of the Invention

Electronic equipment must receive a supply of power from a source of electricity. Most electronic equipment available today is powered directly from an alternating current (AC) source, such as a conventional wall outlet. Other, generally portable, devices are typically powered by batteries that must be periodically replaced after the batteries in use run down.

For convenience and economic reasons, rechargeable batteries are often employed in equipment that relies on batteries for power. Such batteries are well-known and come in several varieties, including Nickel-Cadmium(Ni-Cad) and Nickel metal Hydride (NiMH), to name just two. Such batteries are also available in a myriad physical configurations.

Some electronic equipment operates from both conventionally available AC power and battery power. For example, a cordless telephone typically includes a base station that is powered via an AC outlet and a cordless handset that is powered by a battery, or batteries (hereafter "batteries"). In most cordless telephones available today, the batteries that provide power to the cordless handset are rechargeable. When the cordless handset is mounted in the base station, the base station is configured to recharge the batteries in the cordless handset such that the batteries maintain the greatest possible amount of charge.

Despite the constant charging of the cordless handset batteries, it is not uncommon for the batteries to run down during prolonged use such that the handset can no longer be used. Some cordless telephone systems have, in view of this problem, standby batteries that are stored in the base station of the telephone and separately re-charged. Thus, when the cordless handset batteries run down, it is possible to simply swap the handset batteries with second, or stand-by, batteries that are stored and charged within the base station. The run down handset battery is then re-charged within the base station. In some cases, the batteries in the base station may also be used to provide stand-by power to the base station itself in the event of a power failure, wherein AC power is not available.

FIG. 1 is a schematic representation of selected portions of a conventional cordless telephone base station 100 and its interconnection with second or stand-by batteries. Base station 100 typically comprises a printed circuit board (PCB) 105 that includes electronic components that provide telephony functionality, along with assorted other features such as telephone number memory, caller ID functionality and display features. In addition, PCB 105 might also include a power supply 107, or at the very least, a means for distributing power, received from plug or transformer 110, which is plugged into a conventional AC wall outlet.

To support second, or standby, batteries, PCB 105 (or some other portion of the internal components of base station 100) includes a battery charging circuit 114 that includes output terminals 116a, 116b. Output terminals 116a, 116b are connected via wires 118 to a drawer 122 that includes terminals 120a, 120b.

Drawer 122 typically has a shape that is consistent with the type of batteries that base station 100 and a handset use. Drawer 122 is preferably spring loaded (e.g., via springs 125) and biased to be pushed toward the exterior of base station 100. Drawer 122 is held in place within the body of base station 100 by way of a user-movable latch (not shown).

To replace or swap batteries, a user simply displaces the latch, which causes the drawer to automatically and at least partially eject itself from base station. This state is shown in FIG. 1. The user then removes the batteries present within drawer 122 and inserts rundown batteries and closes drawer 122. While this seemingly simple battery replacement procedure would not be expected to be potentially dangerous, there is, in actuality, the possibility that a user could be unexpectedly electrically shocked. Specifically, terminals 120a, 120b are, even when drawer 122 is in its open state, in contact with battery charger output terminals 116a, 116b via wires 118. Since base station 100 may be a telephone apparatus, it is typically connected to outside telephone wires. In addition, base station 100 is connected to an AC source of power through plug or transformer 110. Accordingly, in the event of a lightning strike to the power lines or telephone lines, or in the event of a malfunction in base station 100, any of which could cause unexpectedly high voltage/current levels within the circuitry of PCB 105, it is possible that such unexpectedly high voltage/current levels could be transferred across wires 118 and be present at terminals 120a, 120b with which a user may easily come into contact when performing a battery replacement procedure.

In view of the possible danger associated with replacing a battery in known devices, there is a need for improved battery storage, holding and recharging systems.

BRIEF SUMMARY OF THE INVENTION

The present invention provides a mechanically isolated battery charging apparatus that precludes a user from inadvertently coming into contact with electrically live contacts. Specifically, a battery drawer in which batteries are placed to be recharged (although the present invention should be understood to also cover a non-recharging battery drawer) is configured such that, when in an open state, electrical contact with a battery charging circuit is broken. Consequently, even if there is an unexpected power surge (due to lightning or an internal telephone malfunction), the user is protected from potential electrical shock.

In accordance with an embodiment of the invention, a battery holding apparatus comprises a drawer having a front face and sides, the sides respectively having a flange extending therefrom. At least two contacts each having front-facing and back-facing portions are provided, wherein the front-facing portions are in contact with a terminal of a battery when the drawer holds a battery. An extension portion extends beyond the at least two contacts and in a direction away from the front face. A battery drawer cover having protrusions extending therefrom is positioned and secured over the drawer. The protrusions have at least two springs arranged to come into contact with the back-facing portions of the at least two contacts, and the at least two springs are in electrical contact with a battery charging circuit. When the battery drawer is in a closed state, the at least two springs are compressed between the protrusions and the back-facing portions of the contacts such that electrical power is provided to the at least two contacts, and when the battery drawer is released to be in an open state, the at least two springs act to push the battery drawer away from the protrusions such that any electrical circuit previously established is opened.

Thus, the present invention provides a battery drawer apparatus having a contact that is isolated from outside electrical circuitry when the drawer's battery contact is accessible to a user. Also, when the drawer apparatus is open, the batteries being held therein are disengaged from the outside circuit. In a preferred implementation, the contacts operate to both establish electrical contact with the batteries and the outside electrical circuit, and to provide ejection force to the drawer when the drawer is unlatched.

These and other features of the present invention along with their attendant advantages will be more fully appreciated upon a reading of the following detailed description in conjunction with the associated drawings.

DETAILED DESCRIPTION OF THE INVENTION

Figure 1:
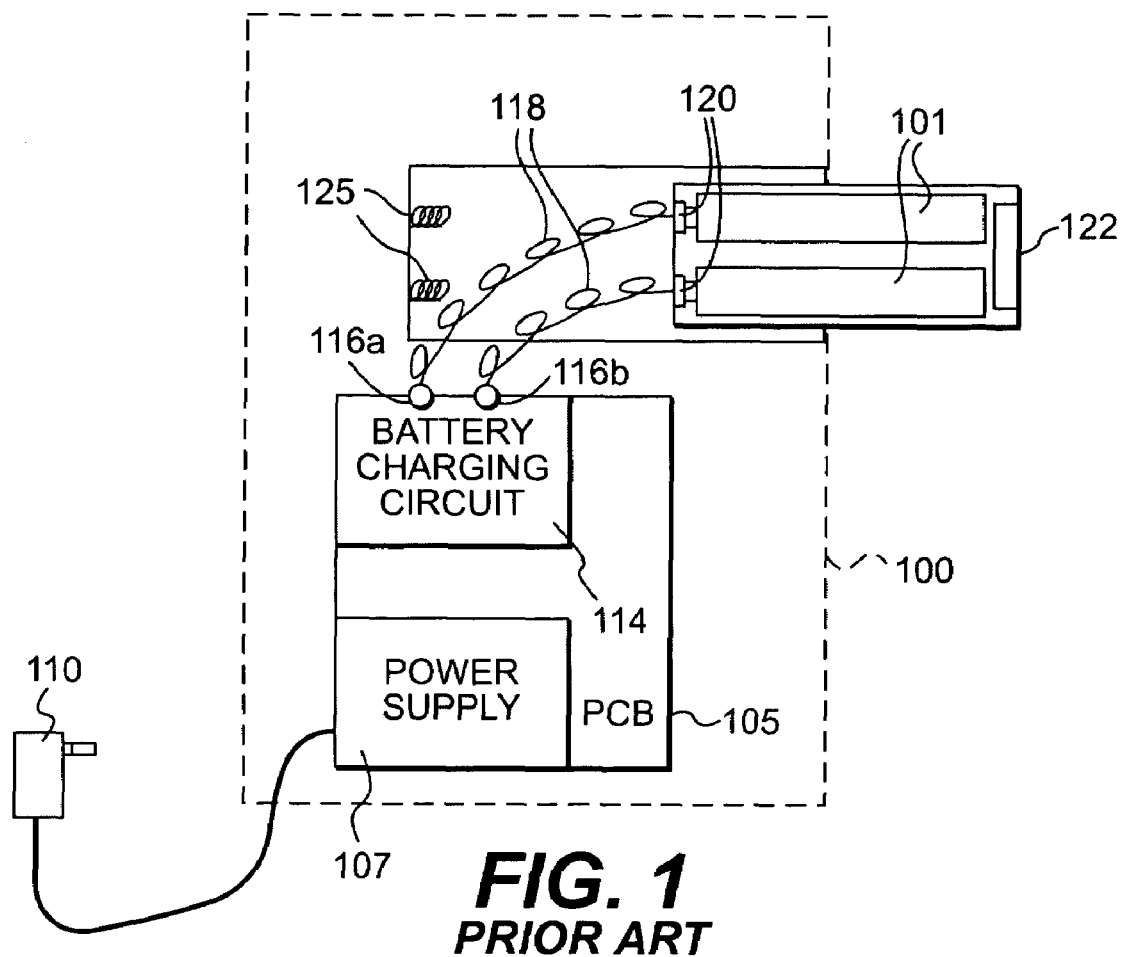
FIG. 1 is a schematic diagram of the electrical interconnections of a conventional battery drawer.
Figure 2:
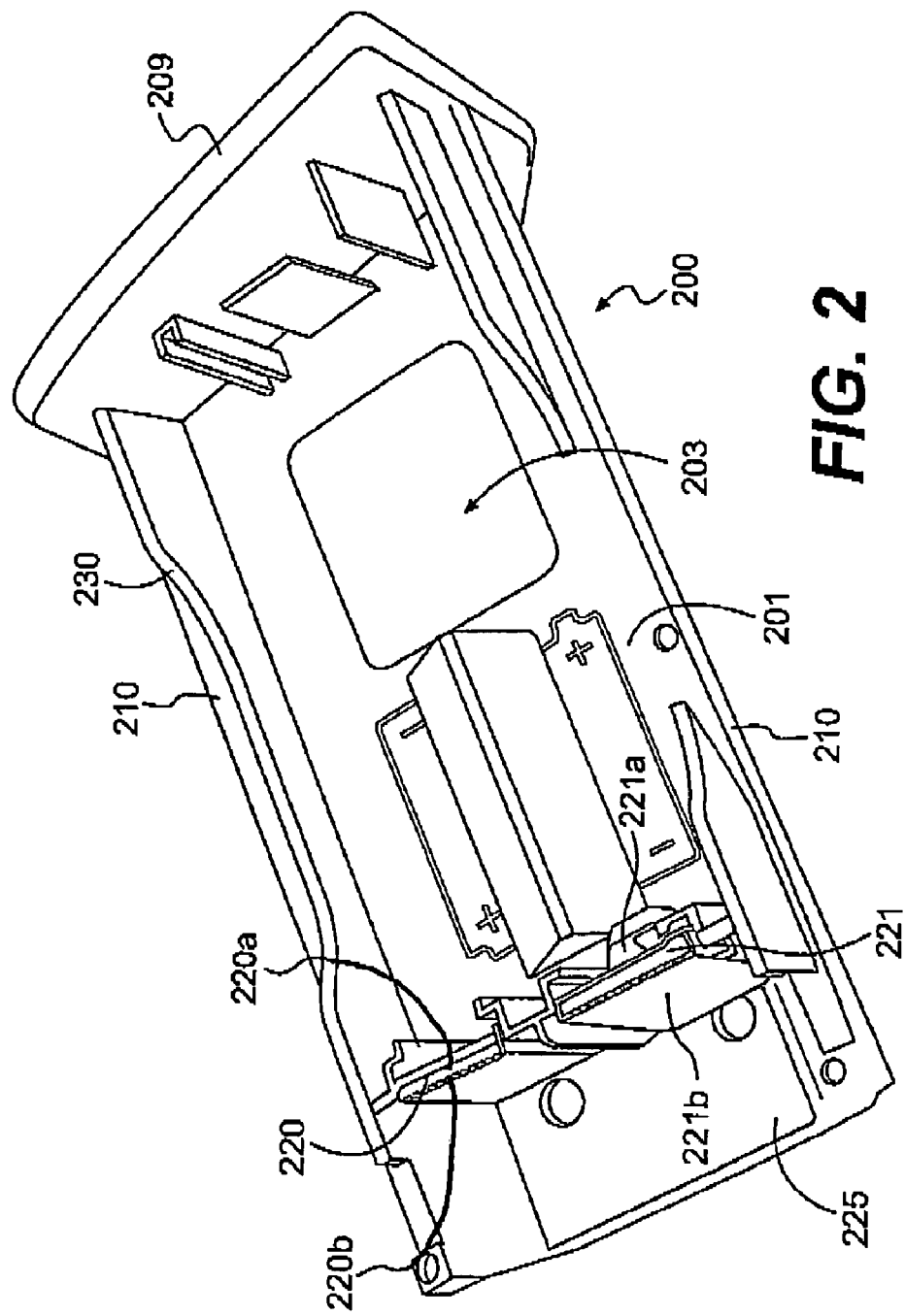
FIG. 2 is a perspective view of a battery drawer in accordance with an embodiment of the present invention.
Figure 3:
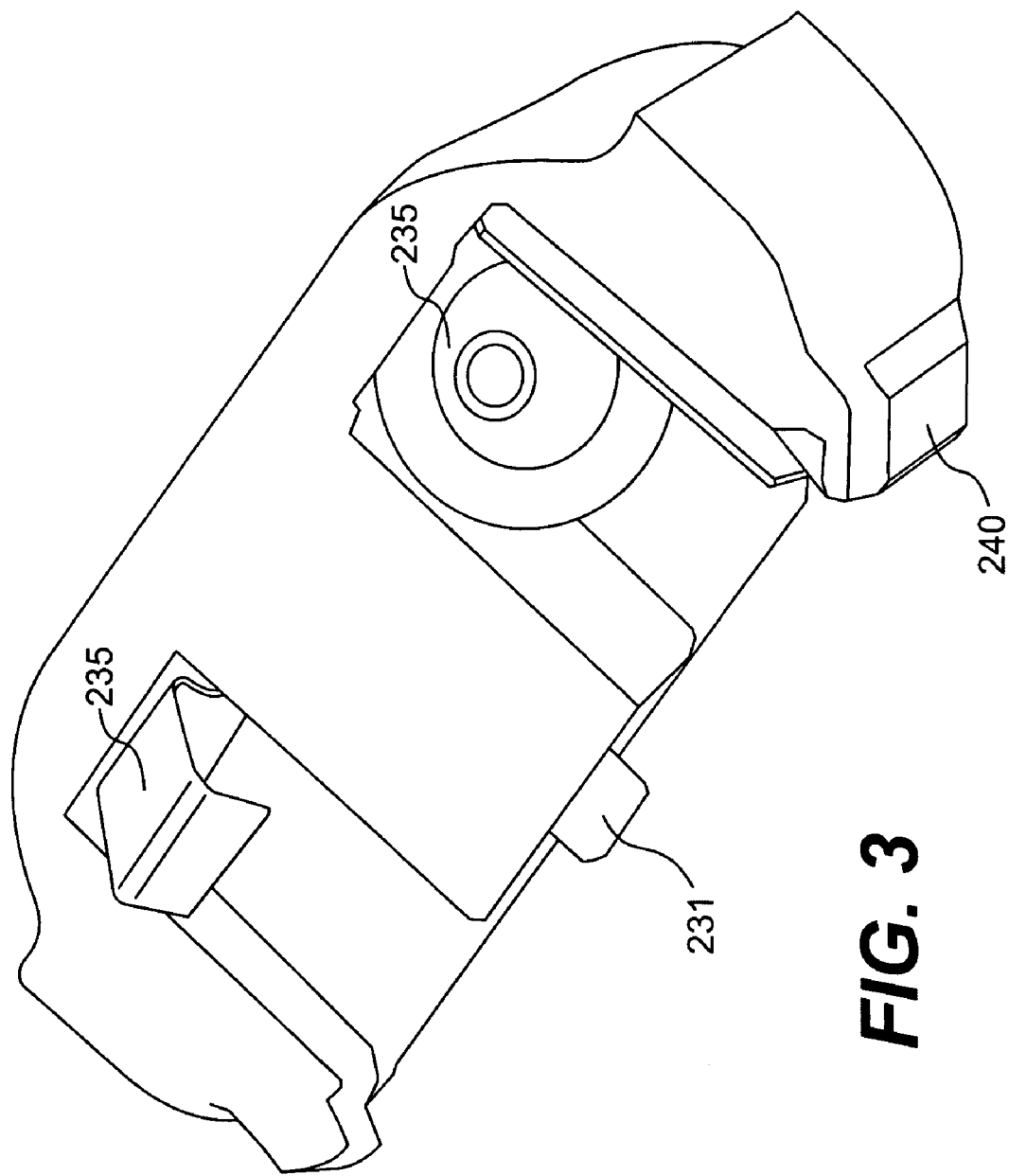
FIG. 3 is a perspective view of a battery drawer insert in accordance with an embodiment of the present invention.

FIG. 2 shows a portion of a battery drawer 200 in accordance with the present invention. Battery drawer 200 preferably comprises a body 201 that defines a cavity 203, which has a shape consistent with holding predetermined size batteries. In this case, drawer 200 is configured to hold AA or AAA type batteries, although virtually any rechargeable battery type or shape can be employed in connection with the present invention. Drawer 200 further comprises a front cover 209 that, when the drawer is fully inserted into a base station, is flush with an exterior wall of the base station, as shown more clearly in FIG. 4. Drawer 200 preferably also includes flanges 210 that extend along either side of drawer 200 and which are configured to slide along corresponding rails 401 within a body 400 of the base station. Contacts 220, 221 each having cavity-facing portions 220a, 221a and back-facing portions 220b, 221b are disposed at an end of drawer 200 opposite to that of front cover 209. Beyond contacts 220, 221 is an extension portion 225 that slides underneath a cover 600 to drawer 200, as is shown more clearly in FIG. 4. At the end of drawer 200 closest to front cover 209 there is preferably inserted a front insert 240, as shown in FIG. 3, that includes contacts 235, which are electrically connected to each other, and a key 231 that fits into a corresponding notch 230 in drawer 200. Contacts 220, 221 and 235 comprise contacts by which batteries inserted into cavity 203 can become electrically connected to each other.

Figure 4:
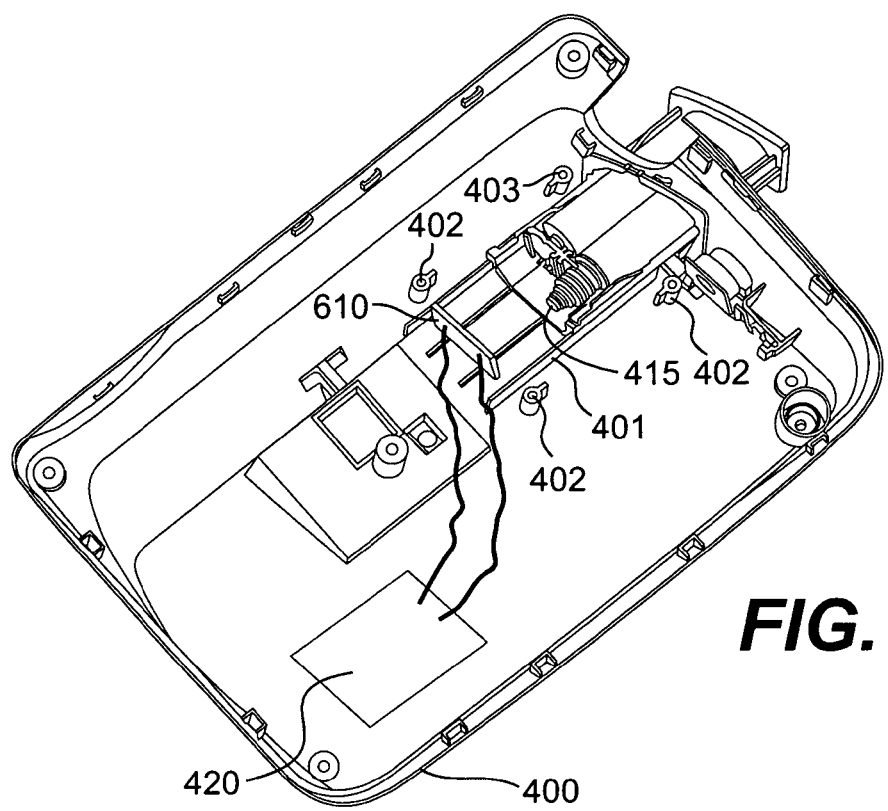
FIGS. 4 and 5 depict an embodiment of a mechanically isolated battery drawer in accordance with the present invention in, respectively, opened and closed positions.
Figure 5:
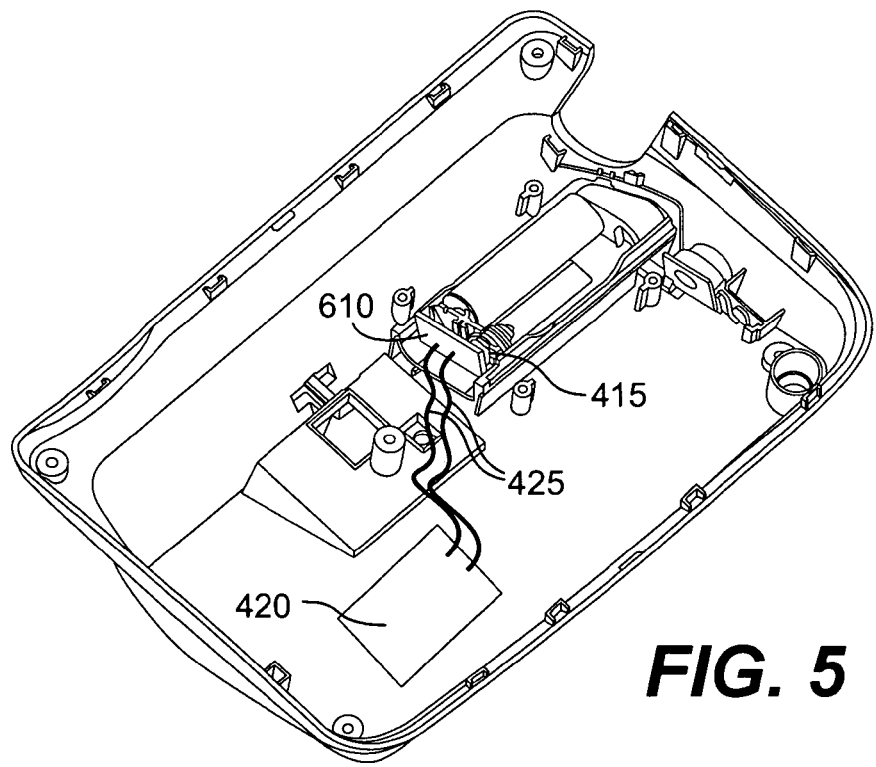

FIGS. 4 and 5 show drawer 200 in both closed and open states. FIG. 4 shows rails 401 that support respective flanges 210 and upon which drawer 200 slides. FIGS. 4 and 5 also show a body 400 of, for example, a base station of a cordless telephone apparatus, into which drawer 200 is inserted. Body 400 is preferably made of molded plastic and includes a plurality of screw posts 402 that secure battery drawer cover 600 over drawer 200. A portion 610 of battery drawer cover 600 is shown in FIGS. 4 and 5.

Figure 6:
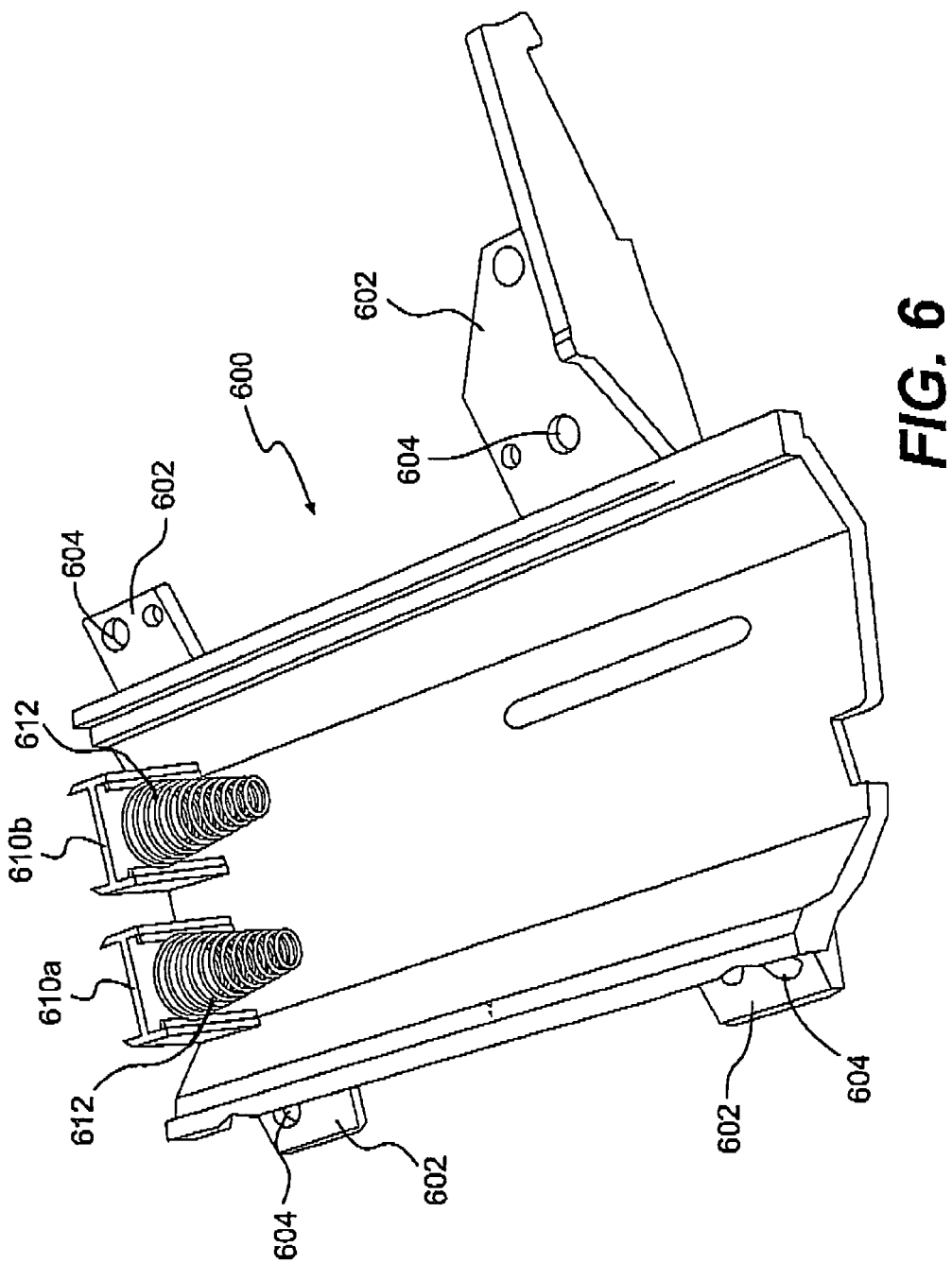
FIG. 6 is a perspective view of a battery drawer cover in accordance with an embodiment of the present invention.

FIG. 6 is a perspective view of an underside of battery drawer cover 600. When mounted inside body 400, this component is actually flipped over such that the surface shown in FIG. 6 faces cavity 203 when drawer 200 is in its closed state.

Battery drawer cover 600 preferably includes flanges 602, which themselves include holes 604 that are in registration with screw posts 402, to secure battery cover 600 to body 400 and allow drawer 200 to move freely underneath. In addition, in accordance with a first embodiment of the present invention, battery drawer cover 600 preferably includes protrusions 610a, 610b on which are mounted biasing means such as springs 612. Protrusions 610a, 610b are represented by portion 610 shown in FIGS. 4 and 5.

When drawer 200 is in a closed state as shown in FIG. 5, springs 612 are compressed between protrusions 610a, 610b and contact portions 220b, 221b, respectively. In accordance with the present invention, springs 612 are comprised of electrically conductive material, such as metal, and are connected to a battery charging circuit 420 via wires 425, as shown in FIGS. 4 and 5. When drawer 200 is released and allowed to move into its open state, even if a user were to inadvertently contact contacts 220, 221 by reaching into cavity 203 from outside of body 400, there would be no possibility of electrical shock to the user since there is no electrical connection between any battery charging circuit and the contacts directly associated with drawer 200. It is only when drawer 200 is substantially inserted within base station body 400 that electrical contact is made with any battery charging circuitry. Moreover, even in the event the interior compartment of base station body 400 is exposed as shown in FIGS. 4 and 5, battery drawer cover 600 covers cavity 203 such that it is not possible to even access cavity 203 to replace batteries. In other words, it is preferably only possible to replace batteries when drawer 200 is substantially extended outward from body 400 such that electrical contact between contacts associated with drawer 200 are necessarily detached from any other electronic componentry.

As mentioned above, the configuration of battery drawer cover 600 is consistent with a first embodiment of the present invention, wherein battery drawer cover 600 includes the biasing means (e.g., springs 612) that cause drawer 200 to be ejected from base station body 400 when a latch is displaced, and function also to provide electrical connection to a charging circuit when drawer 200 is closed (or substantially closed).

In a second embodiment according to the present invention, the biasing means are instead mounted on drawer 200. As shown in FIGS. 4 and 5, spring 415 is shown mounted immediately adjacent contact portion 221b. Of course, in an actual implementation, a second spring would also be mounted next to back-facing portion 220b. Thus, in the second embodiment, protrusions 610a, 610b (or, instead, a single or unitary protrusion 610, as shown in FIGS. 4 and 5) would include electrical contacts that operate to electrically connect battery charging circuit 420 to batteries in drawer 200.

It is noted that the first embodiment has an advantage over the second embodiment in that even if drawer 200 were completely removed from base station body 400, the biasing means remains within body 400 attached to battery drawer cover 600 and, therefore, cannot be inadvertently misplaced. In preferred implementations, drawer 200 is held captive by body 400 such that total separation between drawer 200 and body 400 will not typically occur.

Figure 7:
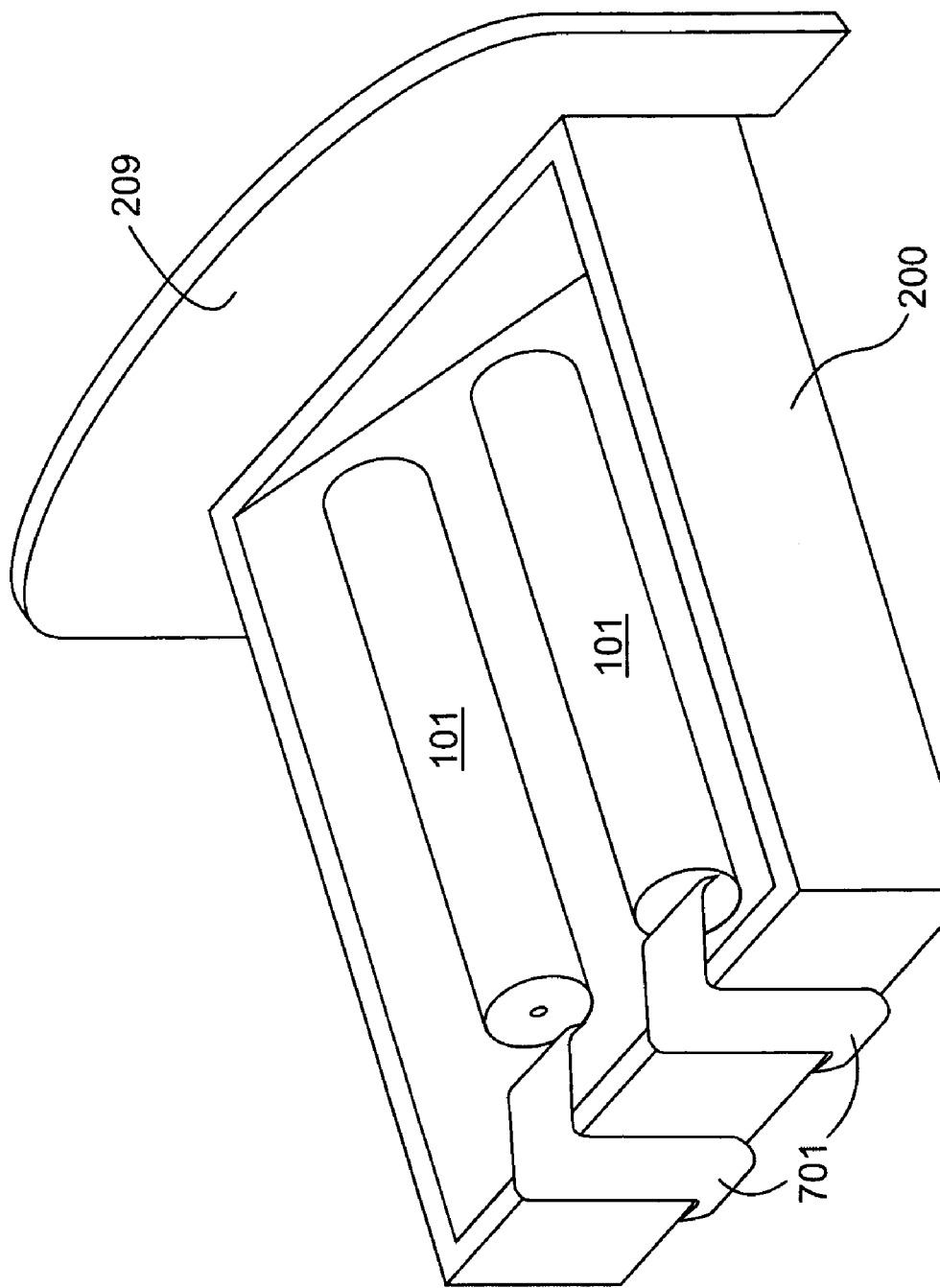
FIG. 7 depicts another embodiment of a mechanically isolated battery drawer in accordance with the present invention.

A third embodiment or the present invention is depicted in FIG. 7. This embodiment is similar to the second embodiment in which the biasing and electrical connection means is integral with drawer 200. However, instead of using spiral springs like spring 415, simple leaf springs 701 are employed. In a preferred implementation, the same continuous leaf springs 701 are also used to provide biasing pressure and electrical connection directly to batteries 101. Consequently, the third embodiment might be less expensive to manufacture in terms of both materials and assembly time.

Thus, as will be appreciated by the foregoing, the present invention keeps a battery drawer contact isolated from associated electrical circuitry when a user might be in a position to inadvertently make contact with the battery drawer contact. This is accomplished by ensuring that when the drawer is in its open state the battery contacts are disengaged from any electrical circuitry, particularly battery re-charging circuitry. In addition, the employed biasing means is not only used to ensure that the drawer is ejected upon displacement of a latch, but is also simultaneously used to establish electrical contact between the battery drawer and a charging circuit when the drawer is in its closed, and thus user-protected, state.

While the present invention has been described in the context of a cordless telephone, the features of the present invention are equally applicable to other types of equipment that include battery drawers in which rechargeable batteries are disposed for recharging.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An apparatus for reducing the potential for electric shock, comprising:
   a body;
   a battery drawer slidably mounted in the body and being operable to have an open state and a closed state, the battery drawer having a cavity and a plurality of contacts arranged to receive at least one battery;
   a battery drawer cover affixed to the body, wherein the battery drawer is slidably moveable thereunder;
   wherein the battery drawer cover extends at least over the top of the at least one battery in the battery drawer, wherein when the battery drawer is in the closed state, even if an interior of the body is exposed, the battery drawer cover obstructs access to the cavity, and
   an ejection mechanism operable to eject the battery drawer from the body and place the battery drawer in the open state, wherein when the battery drawer is in the open state the plurality of contacts are disengaged from any power source from within the body, and
   wherein the ejection mechanism comprises a biasing means mounted to the battery drawer cover.

2. The apparatus of claim 1, wherein when the battery drawer is in the closed state the plurality of contacts are connected to the any power source from within the body.

3. The apparatus of claim 1, wherein the power source comprises a battery charging circuit.

4. The apparatus of claim 1, wherein the biasing mechanism comprises at least one spring.

5. The apparatus of claim 1, wherein a portion of at least one of the plurality of contacts extends beyond the battery drawer and functions as the ejection mechanism.

6. The apparatus of claim 1, wherein the body is a body of a cordless telephone base station.

7. A cordless telephone apparatus having a stand-by battery recharging system, comprising:
   a base station having a body;
   a battery charging circuit disposed in the body;
   a battery drawer slidably mounted in the body, the battery drawer being configured to receive and hold at least one rechargeable battery; and
   a combination ejector and electrical circuit maker all of whose components are completely disposed inwardly within the body with respect to any rechargeable battery held in the battery drawer,
   wherein the combination ejector and electrical circuit maker establishes an electric circuit between the battery charging circuit and the at least one rechargeable battery when the battery drawer is in a closed state, operates to eject the battery drawer from the body, and electrically opens the electric circuit between the battery charging circuit and the at least one rechargeable battery when the battery drawer is in an open state,
   and wherein the battery drawer is held captive in the body in the open state.

8. The apparatus of claim 7, further comprising a battery drawer cover, wherein the battery drawer cover extends at least over the top of the at least one rechargeable battery in the battery drawer.

9. The apparatus of claim 8, wherein at least a substantial portion of the combination ejector and electrical circuit maker is mounted on the battery drawer cover.

10. The apparatus of claim 7, further comprising at least one spring.

11. The apparatus of claim 7, wherein a substantial portion of the combination ejector and electrical circuit maker is mounted on the battery drawer.

12. The apparatus of claim 7, wherein the combination ejector and electrical circuit maker comprises an electrically conductive contact folded in such a way as to maintain the at least one battery within the battery drawer and to bias the battery drawer toward an exterior of the body.

13. A battery holding apparatus, comprising:
   a battery drawer having a front face and sides, the sides respectively having a flange extending therefrom;
   at least one contact having front-facing and back-facing portions, the front-facing portion being in contact with a terminal of a battery when the drawer holds a battery;
   an extension portion that extends beyond the at least one contact and in a direction away from the front face; and
   a battery drawer cover having at least one protrusion extending over the extension portion, the protrusion having at least one spring arranged to come into contact with the back-facing portion of the at least one contact, the at least one spring being in electrical contact with a battery charging circuit,
   wherein, when the battery drawer is in a closed state, the at least one spring is compressed between the protrusion and the back-facing portion of the at least one contact such that electrical power is provided to the at least one contact, and wherein, when the battery drawer is released to be in an open state, the at least one spring acts to push the battery drawer away from the protrusion such that any electrical circuit previously established is opened.

14. The apparatus of claim 13, wherein the battery drawer cover is mounted to a body.

15. The apparatus of claim 13, wherein the front face is flush with a body when the battery drawer is in the closed state.

16. The apparatus of claim 1, wherein the battery drawer is held captive in the body in the open state.

17. The apparatus of claim 4, wherein the at least one spring is operable to both eject the battery drawer out of the body in the open state and to establish electrical connection between the plurality of contacts and an electrical circuit within the body in the closed state.

18. The battery holding apparatus of claim 13, wherein the battery drawer cover extends at least over the top of the at least one battery in the battery drawer in the closed state.

* * * * *